US010164848B1

(12) United States Patent
Chen et al.

(10) Patent No.: US 10,164,848 B1
(45) Date of Patent: Dec. 25, 2018

(54) WEB SERVICE FUZZY TESTER

(71) Applicant: Amazon Technologies, Inc., Reno, NV (US)

(72) Inventors: Xiaozheng Chen, Kirkland, WA (US); Dhammika Deshapriya Weerasundara, Kirkland, WA (US); Stella-Maris Goette Jacoby, Issaquah, WA (US); Pedro De Jesus Rodriguez, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 793 days.

(21) Appl. No.: 14/299,796

(22) Filed: Jun. 9, 2014

(51) Int. Cl.
  *G06F 15/173* (2006.01)
  *H04L 12/26* (2006.01)
  *G06F 11/36* (2006.01)

(52) U.S. Cl.
  CPC .......... *H04L 43/06* (2013.01); *G06F 11/3684* (2013.01)

(58) Field of Classification Search
  CPC .............................. H04L 43/06; G06F 11/3684
  See application file for complete search history.

(56) References Cited

U.S. PATENT DOCUMENTS

| | | | | |
|---|---|---|---|---|
| 8,613,080 B2* | 12/2013 | Wysopal | ............. | G06F 11/3612 726/19 |
| 8,978,020 B2* | 3/2015 | Rossi | ................... | G06F 11/3684 717/131 |
| 9,448,820 B1* | 9/2016 | Allen | ...................... | G06F 9/455 |
| 2005/0203957 A1* | 9/2005 | Wang | ................ | G06F 17/30917 |
| 2008/0301647 A1* | 12/2008 | Neystadt | ............. | G06F 11/3672 717/127 |
| 2012/0059822 A1* | 3/2012 | Malandain | ........ | G06F 17/30616 707/736 |
| 2013/0238972 A1* | 9/2013 | Woodman | ......... | G06F 17/30861 715/234 |

(Continued)

OTHER PUBLICATIONS https://web.archive.org/web/20000603034429/http://www.sjsu.edu/faculty/watkins/stoch.htm, Thayer Watkins; Stochastic Process; San Jose Univ Economics Dept.*

(Continued)

*Primary Examiner* — Yves Dalencourt
(74) *Attorney, Agent, or Firm* — Kilpatrick Townsend & Stockton LLP (57) ABSTRACT

Techniques for providing a testing feature for computer programs may be provided. In some examples, seed input information and a network service identifier may be received from a user. A programmatic interface schema associated with the network service identifier may be parsed for metadata. In some examples, the metadata may include parameter information associated with the programmatic interface schema. Input information for a network service associated with the network service identifier may be determined based at least in part on the metadata and the seed input information. The seed input information may include a plurality of input permutations for an interface element of the programmatic interface schema. In some examples, the interface element utilizing the input information may be invoked to generate result information. The result information may indicate functionality of the interface element of the network service with an input permutation of the plurality of input permutations.

19 Claims, 8 Drawing Sheets

(56) References Cited

U.S. PATENT DOCUMENTS

2014/0130111 A1* 5/2014 Nulty .................. H04N 17/004
                                                            725/107
2015/0169432 A1* 6/2015 Sinyagin ............. G06F 11/3684
                                                            717/124

OTHER PUBLICATIONS https://web.archive.org/web/20120621022411/http://www.codeproject.com/Articles/406096/A-beginners-tutorial-for-understanding-Windows, Rahul Singh, Understanding WCF, Jun. 18, 2012, Code Project.*

* cited by examiner

*Scan completed, 117 errors found.* ← 302  
Scanner Report 300  
Scanner Report  
← 304  
Generated at:2013-10-16T00:02:50.425-07:00 ← 306  
Service:http://service.company.com:8000  
Seeds:{ } ← 308  
Summary

| Method 310 | Internal Error | Connection Issues | Invalid Input | OK |
|---|---|---|---|---|
| QueueAdCandidateForApproval | 100 | 0 | 0 | 0 |
| Unenroll | 7 | 0 | 0 | 35 |
| IsEnrolled | 4 | 0 | 0 | 37 |
| BatchQueueAdCandidates | 3 | 0 | 4 | 25 |
| GetAdCandidatesByID | 1 | 0 | 0 | 7 |
| TrafficAdsForDsn | 1 | 0 | 7 | 7 |
| FetchAdCandidate | 1 | 0 | 9 | 0 |
| Enroll | 0 | 0 | 0 | 36 |
| BlacklistID  312 | 0 | 0 | 0 | 33 |
| ListTrafficReadyAds | 0 | 0 | 17 | 4 |
| UnBlacklistID | 0 | 0 | 0 | 20 |
| GetNextAdCandidateId | 0 | 0 | 1 | 15 |
| RecordFeedback | 0 | 0 | 100 | 0 |
| ListAdCandidates | 0 | 0 | 41 | 0 |
| RemoveAdsForID | 0 | 0 | 2 | 7 |
|  | 314 | 316 | 318 | 320 |

← 322

Details
- Internal Error 500
    - FetchAdCandidate | *{"adCandidateId":null}* | HTTP/1.1 500 Internal Server Error | *{"__type":"com.company.coral.service#InternalFailure"}*
    - Unenroll | *{"obfuscatedCustomerId":"","dsn":null,"obfuscatedDeviceType":"foo"}* | HTTP/1.1 500 Internal Server Error | *{"__type":"com.company.coral.service#InternalFailure"}*
    - Unenroll | *{"obfuscatedCustomerId":"","dsn":"Qd$%a< %(U%^uK$ mvH><%P#$(A g %^H $w(e>(#^ c iX!P$ ! %Pd # a eNu!>a!S(((%K I>(d$%^b! <$h#(kt^$I (#p L<$#nnJG ","obfuscatedDeviceType":"™¡™ £ ¢ ∞"}* | HTTP/1.1 500 Internal Server Error | *{"__type":"com.company.service#InternalFailure"}*

WEB SERVICE FUZZY TESTER

BACKGROUND

Computer application development can be handled by a large development team consisting of several smaller teams assigned to various tasks associated with a development project. An organization may also employ a separate implementation team that relies on code comments, implementation design notes, and direct communication from the development team in order to properly implement the computer application. Both the development and implementation team may need to perform functionality tests to confirm that updates to the application do not cause performance issues or conflict with changes made by other people. A development team may develop a web service while the implementation team, that may be a distinct group from the implementation team, may be a group of people who use the web service. Currently, a developer can manually create these tests to confirm the functionality of a computer application after changes have been made. However, manually creating tests is inefficient and often does not account for all potential problems associated with a computer application during and after its development.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, methods, and computer-readable medium for providing a testing input feature for computer applications. A service may be provided for automatically determining test input (e.g., fuzzy testing input) for a particular computer application. The service may also execute any methods associated with the computer application utilizing the determined testing input and generate a report. The report may indicate the functionality of a method with the fuzzy testing input and indicate which input permutations specifically caused errors during execution. Fuzzy testing input or testing input as used in the present disclosure refers to providing random, and in some examples invalid, data to a computer program to test for security problems and crashes. The testing input provided may include random values but with respect to a parameter as identified in a data schema or model associated with a computer program. In accordance with at least one embodiment, the test input may be a random distribution of values around a seed value for a parameter type according to a data schema or user provided seed. In accordance with at least one embodiment, the service may parse a data schema or model associated with a network service resource identifier to identify specific parameters types associated with application program interface (API) calls or web forms included in the network service resource identifier.

As used herein, the phrase "parameter type" may include any programmatic language data type including primitive data types, or complex data types either associated with a program language or defined within a program language. In accordance with at least one embodiment, the service may be capable of interacting with any API, library, web form, or code object that includes method signatures and is written with a programmatic language to determine testing input. The network service identifier may have a programmatic interface that has interface elements. A web form may include any network resource page that uses markup languages to communicate with software to execute actions such as formatting text or images to be displayed to a user. As used herein, the phrase "data schema or model" includes any information that indicates a way to specify a relationship between a programmatic interface (including a network resource identifier, a web service uniform resource locator, an API, a library, a web form, or a code object) and its interface elements. A programmatic interface can include any suitable messaging protocol. As used herein, the phrase "method" may include computer executable instructions associated with a data object which has access to the object's data and its variables. The phrase "method signature" may include information corresponding to a method including at least a method name, a number of arguments or parameters, a method validation, method dependencies, or rules of the arguments/parameters, and may define the inputs and outputs for the method. A method may compute output based on the input it receives via computer executable instructions.

In a non-limiting example, a service incorporating the testing input feature described herein may receive a network service identifier from a user. The service may parse a data schema associated with the network service identifier to determine method signature information, including parameter types for computer program methods included in the data schema. For example, the service may determine that one method is included in the data schema with an integer data type parameter and a string data type parameter. In accordance with at least one embodiment, the service may then generate test input based on the method signature information. The test input may include a plurality of input permutations corresponding to the determined method signature information. The service may execute the method with the test input to determine the functionality of the method with each permutation of the test input. The service may collect the result of each test and generate a report of the results. The report can include information indicating the functionality of the method with the test input variations and errors, if any, detected with the test input variations.

The service may be used during a building process of computer application development. For example, the service may provide test input for a data schema as changes are made to the code and during the build process generate a report indicating errors, if any, and the specific input that caused the errors based on the recent changes made to the code of a computer application. A user may utilize the service as a standalone tool, capable of being invoked by through an operating system user interface. The user may utilize a self-service web application user interface, capable of being invoked through any network connected device running any suitable operating system (OS). The user may utilize the service via a command line instruction, a network document user interface, or as a build target during a build and deployment process as described above. The service may provide a report when the service is invoked that includes any internal errors or unhandled failures identified by the testing input permutations.

The user may specify seed input information for particular parameters of a method associated with a network service identifier. For example, a user may pre-define input for certain fields or parameters of a method associated with a network service identifier and the service will automatically detect and generate test input for the remaining parameters of the method. In some examples, the pre-defined input may include static inputs, input ranges, weights for different inputs, and rules/dependencies between input variables. The service may generate test input, execute the methods with the test input, and generate a report of errors for only one or more methods specified by the user and excluding all other methods that are associated with a programmatic interface or network service identifier. In accordance with at least one embodiment, the user may specify to the service one or more methods associated with a programmatic interface or network service identifier to include or not include during its test input generation, execution, and error reporting.

Figure 1:
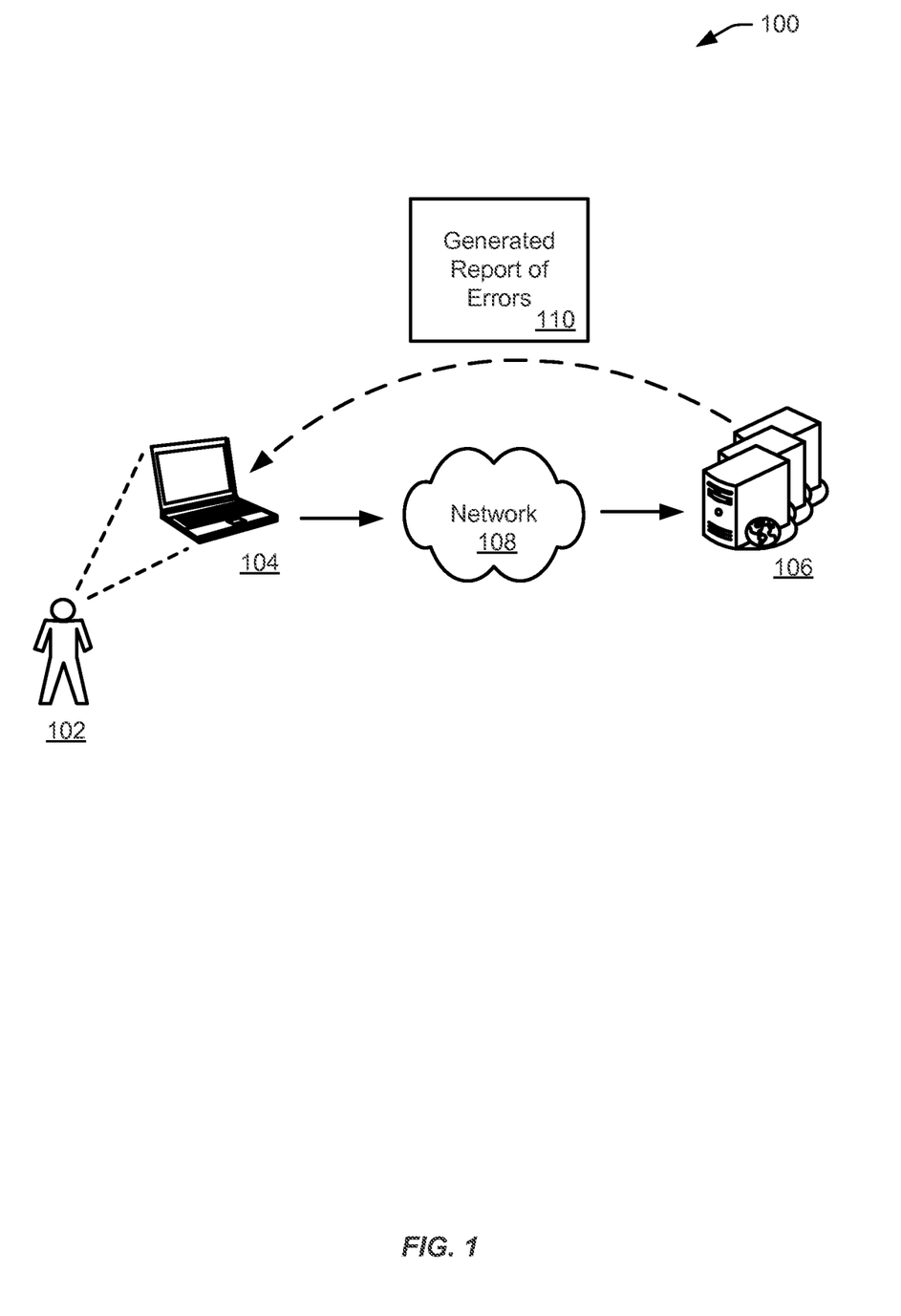
FIG. 1 is a flow diagram that illustrates an example of a testing input feature in accordance with at least one embodiment.

FIG. 1 is a flow diagram 100 that illustrates an example of a testing input feature in accordance with at least one embodiment. In accordance with at least one embodiment, a user 102 interacting with a computing device 104 may provide a resource network identifier for a network service to one or more service provider computers 106. As described above, the user may interact with a web graphical user interface (GUI), utilize a one click deployment tool, including command line instructions, or integrate the service as a build target during development to invoke the testing input feature as described herein. In accordance with at least one embodiment, the user 102 may provide the resource network identifier to the one or more service provider computers 106 via one or more networks 108. In accordance with at least one embodiment, the one or more service provider computers 106 may parse a data schema or model associated with the network service identifier to generate testing input. For example, the data schema or model may indicate a plurality of method signatures which can be parsed by the service to determine the appropriate data types for each parameter of the method signatures. In accordance with at least one embodiment, the programmatic interface may be specified with a web service definition language, such as web services description language (WSDL), extensible markup language (XML) schema, JavaScript Object Notation (BON), or any suitable web service definition language capable of communicating via a simple object access protocol (SOAP), hypertext transfer protocol (HTML) or representational state transfer (REST) architecture.

In accordance with at least one embodiment, the one or more service provider computers 106 may execute each method with the generated testing input to determine the functionality of the method with a particular testing input permutation and collect the results of the execution. In accordance with at least one embodiment, the one or more service provider computers 106 may collect the results and generate a report of errors 110 associated with executing the methods with the testing input. In accordance with at least one embodiment, the generated report of errors 110 may be provided to the user 102 via the computing device 104. For example, the service may provide the report to the user via an email, by providing the report to a file transfer protocol server for download by users of the service or by the service itself, or a network document capable of being presented in a web browser. In accordance with at least one embodiment, the report can include information indicating any errors or unhandled exceptions and the specific testing input parameter/method used to result in the error or unhandled exception.

Figure 2:
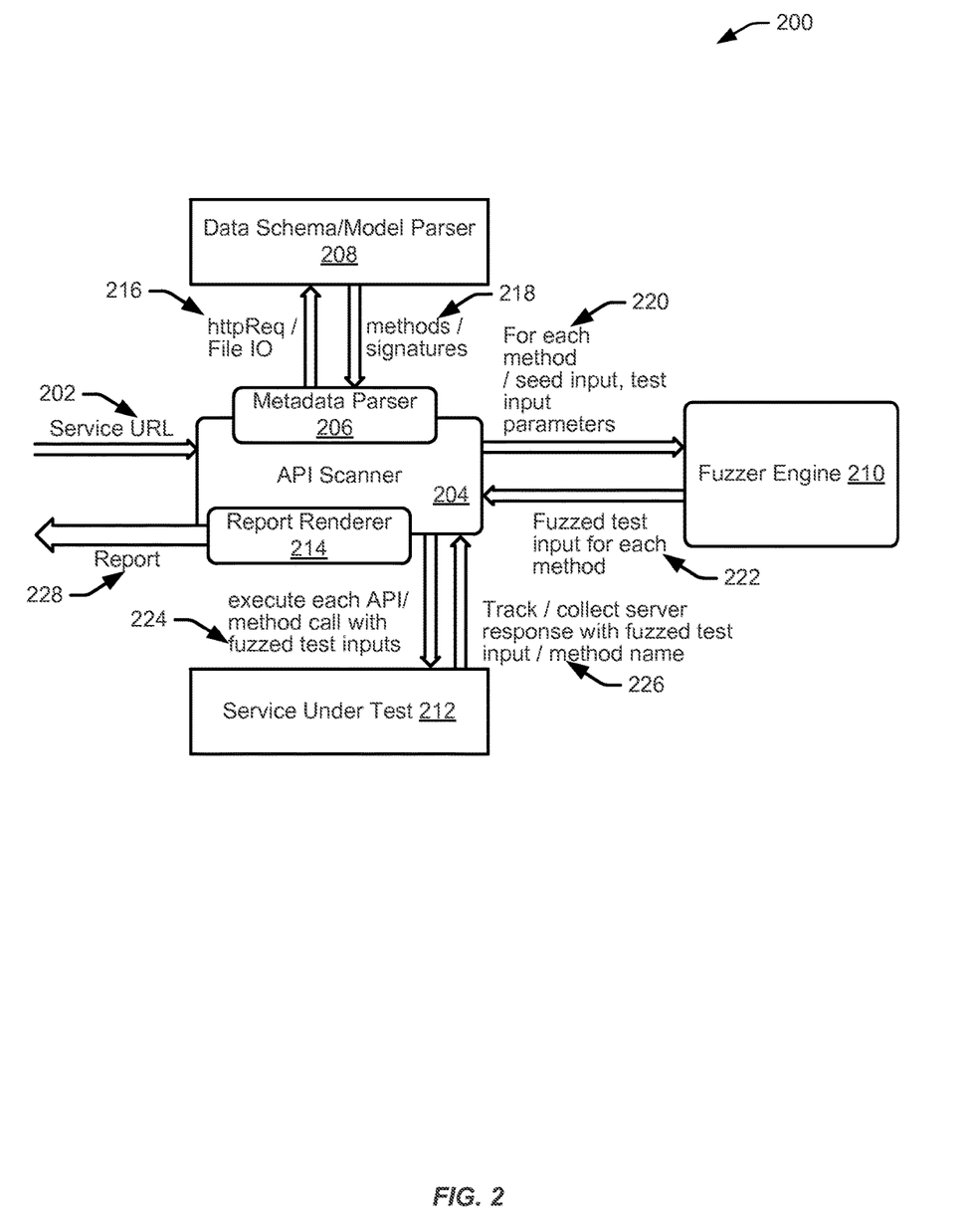
FIG. 2 illustrates a data flow diagram for a testing input feature in accordance with at least one embodiment.

FIG. 2 illustrates a data flow diagram for a testing input feature in accordance with at least one embodiment. In accordance with at least one embodiment, the data flow 200 for a testing input feature may begin by receiving a service uniform resource locator (URL) 202 at an API scanner 204. A service URL may be an example of a network resource identifier or network service identifier. The service URL may have one or more associated APIs and a data schema or model. In accordance with at least one embodiment, the testing input feature may be implemented by one or more components maintained by the service and implemented as software or hardware components. The components included in data flow 200 include the API Scanner 204, a metadata parser 206, a data schema/model parser 208, a fuzzer engine 210, a service under test 212, and a report renderer 214. In accordance with at least one embodiment, the data flow 200 can include the metadata parser 206 communicating with the data schema/model parser 208 to parse a data schema/model associated with the service URL at 216. As described above, the data schema/model parser 208 may determine method and method signature information for any methods associated with the service URL 202 which may be communicated 218 to the API Scanner 204. In accordance with at least one embodiment, the data schema/model parser 208 may be implemented by a third party that is in communication with the API scanner 204.

In accordance with at least one embodiment, the API Scanner 204 via the metadata parser 206 may determine for each method included in the method signature information 218 input parameter information 220. In accordance with at least one embodiment, the metadata parser 206 may receive the method signature information 218 from the data schema/model parser 208 and determine the input parameter information which may include the input parameter types associated with the methods included in the service URL 202. In accordance with at least one embodiment and as described above, a user may provide seed input information with the service URL. The seed input information and the input parameter types determined by the metadata parser 206 may be communicated 220 to a fuzzer engine 210. In accordance with at least one embodiment, the fuzzer engine 210 may determine a plurality of fuzzed input permutations for each parameter type based on the input parameter information 220. For example, if a parameter type for a parameter of a method has been determined to be an integer, the fuzzer engine may generate a plurality of integer inputs for testing the method included in the service URL. In accordance with at least one embodiment, the fuzzer engine 210 determines the fuzzed test input for each method included in the method signature information 218 based on the input parameter information 220. In accordance with at least one embodiment, the fuzzer engine 210 may communicate the fuzzed test input for each method 220 to the API scanner 204 at 222.

In accordance with at least one embodiment, the API scanner may interact with a service under test 212 to execute each method or API call 224 associated with the service URL 202, as determined by the data schema/model parser 208, with the fuzzed test inputs determined by the fuzzer engine 210. In accordance with at least one embodiment, the service under test 212 may be implemented by a third party which may be communicated with by the API Scanner 204 via one or more public networks. In accordance with at least one embodiment, the service under test 212 may track and collect a server response of each method and API call with the fuzzed test input 226. In accordance with at least one embodiment, the server response 226 may include the particular fuzzed test input utilized and the method signature information. The particular fuzzed test input and method signature information may be important because when a failure occurs a developer may wish to repeat the conditions to aid in fixing the problem identified by the service. In accordance with at least one embodiment, the report renderer 214 may generate a report 228 which includes information about the tracked and collected server response 226 described above. In accordance with at least one embodiment, the report 228 may be provided to the user that provided the service URL. The report may aid in the development of any APIs or methods included in the service URL by identifying the specific input permutations for each method that caused an error or crash of an associated method.

Figure 3:
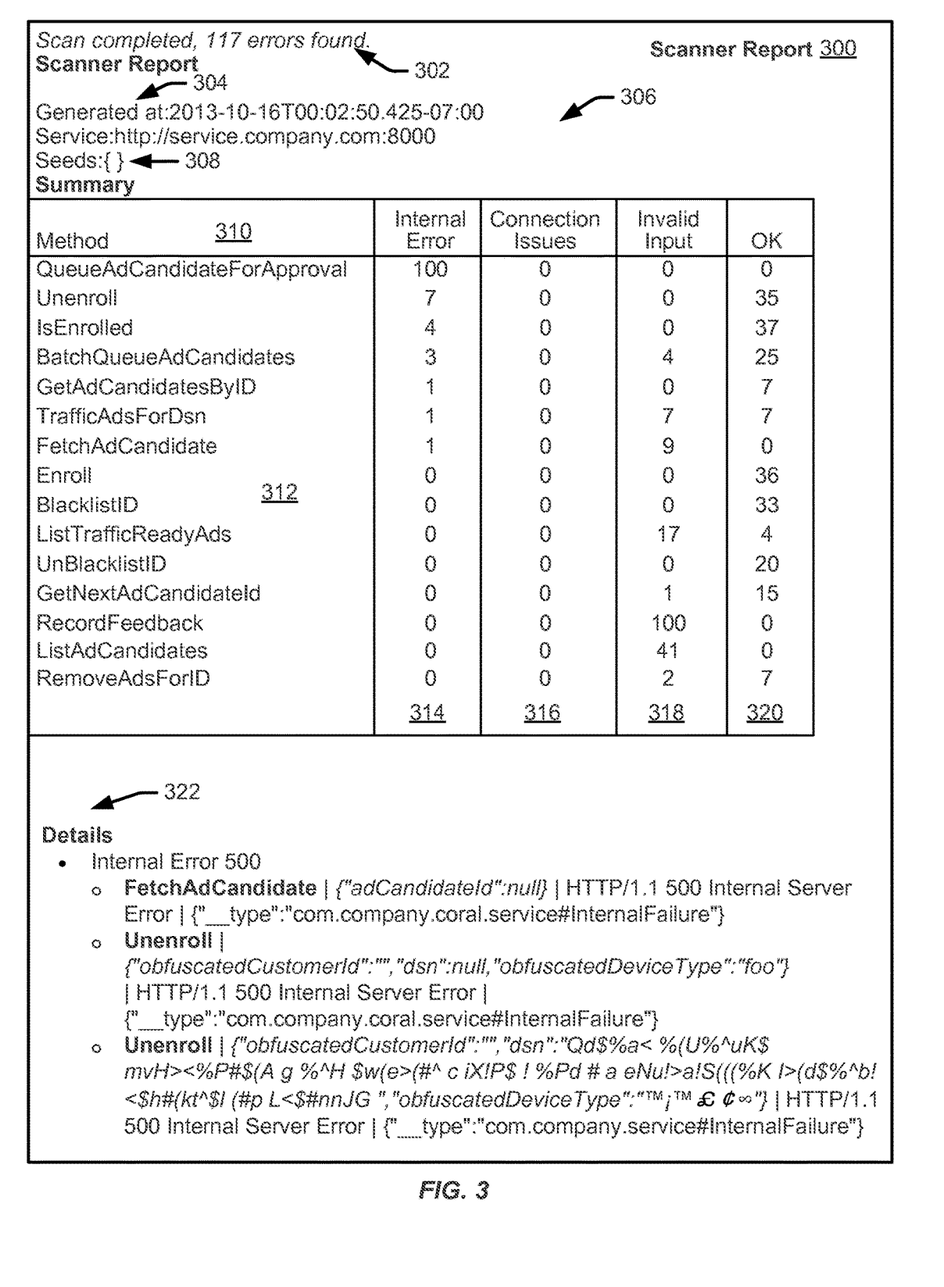
FIG. 3 illustrates an example generated report associated with a testing input feature in accordance with at least one embodiment.

FIG. 3 illustrates an example generated report associated with a testing input feature in accordance with at least one embodiment. FIG. 3 presents an example report 300 that may have been generated in response to receiving a service URL as described in the data flow of FIG. 2. In accordance with at least one embodiment, the report 300 may be generated by the service and include: a short summary of errors detected by the service 302, time stamp information of when the service was executed for a particular web service or network service identifier 304, the received service URL 306, any provided seed input information from a user 308, a summary, table 310, including computer method names or method signature information 312, and potential functionality states of the method with the plurality of fuzzed test input permutations 314, 316, 318, and 320. In accordance with at least one embodiment, the report 300 may include a detail section 322 that includes information specifying the method signature information and the particular fuzzed test input that caused the indicated error. For example, the detail section 322 of FIG. 3 indicates that an Internal Error 500 occurred for the "FetchAdCandidate" method when a null parameter was executed by the method.

In accordance with at least one embodiment, the report 300 may be provided to a user via an email, or presented for display in a web browser to the user if the user is utilizing a web UI as described above to invoke the test input feature. In accordance with at least one embodiment, the service may generate a report, similar to report 300, and create a text file that is stored in the same location as the build of the implemented web service URL or network service identifier. In accordance with at least one embodiment, as a developer makes changes to their code for an API and compiles the program for testing, the service may, be implemented and provide a generated report indicating the functionality of the methods given the recent changes. In accordance with at least one embodiment, the testing input feature described herein may include a report parsing agent. The report parsing agent may detect certain warnings, such as unhandled errors, included in the report after an invocation of the service to generate additional fuzzing test input for the service URL. The report parsing agent may generate an additional report including unhandled error information to aid a developer during the coding process. In accordance with at least one embodiment, the user may specify a destination for the generated error report. For example, along with providing a service URL, the user may also provide an email address or file system destination that the generated report will be sent.

Figure 4:
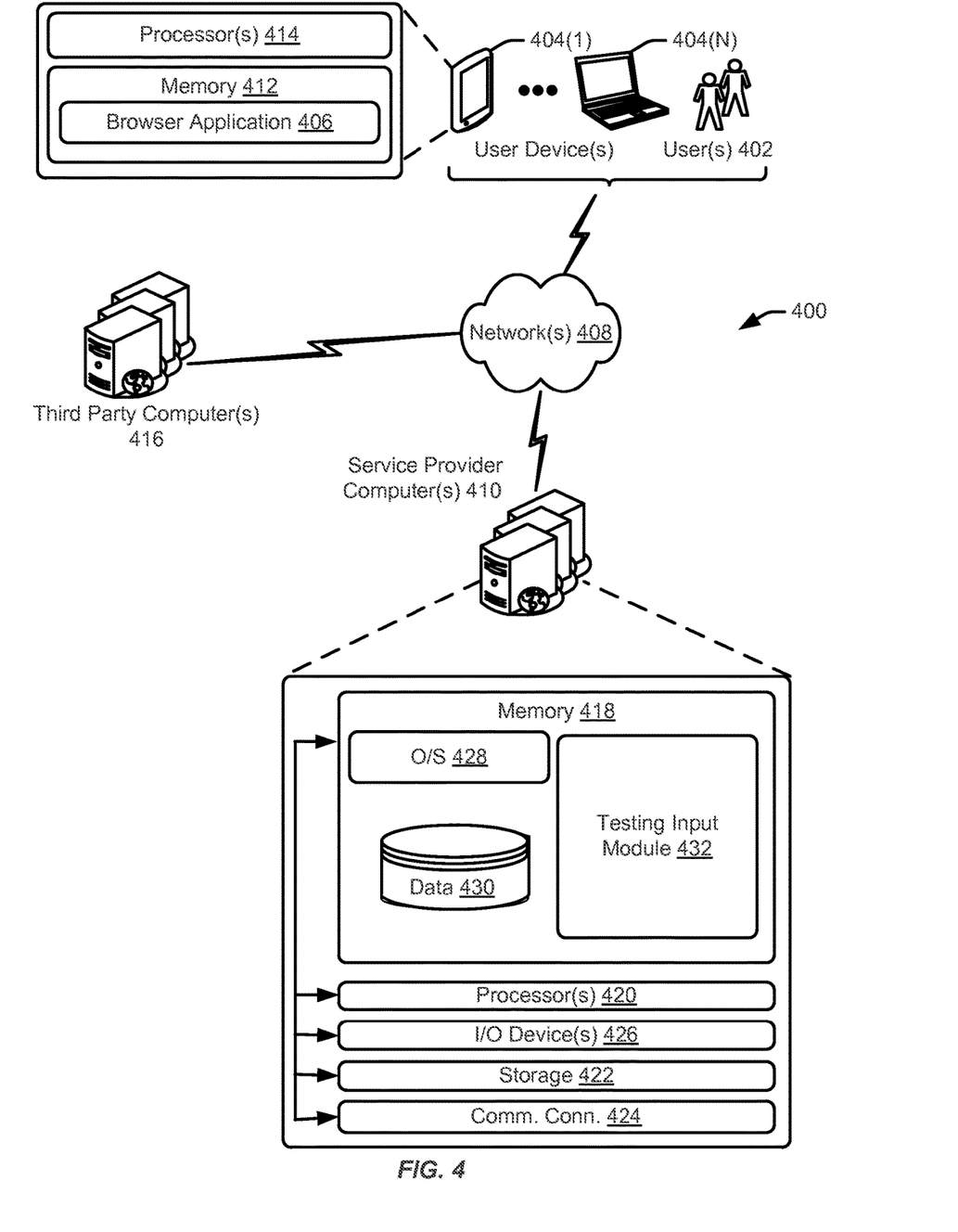
FIG. 4 illustrates an example architecture for a testing input feature as described herein that includes one or more service provider computers and/or a user device connected via one or more networks, in accordance with at least one embodiment.

FIG. 4 illustrates an example architecture for a testing input feature as described herein that includes one or more service provider computers and/or a user device connected via one or more networks, in accordance with at least one embodiment. In architecture 400 one or more users 402 may utilize user computing devices 404(1)-(N) (collectively, user devices 404) to access a browser application 406 (e.g., a web browser) or a user interface (UI) accessible through the browser application 406, via one or more networks 408. The "browser application" 406 can be any browser control or native application that can access and display a web page or other information. In some aspects, the browser application 406 may display an interactive UI for invoking the testing input feature and the generated report of errors as described above. In some aspects, the browser application 406 may be hosted, managed, and/or provided by a computing resources service or service provider, such as by utilizing one or more service provider computers 410. The one or more service provider computers 410 may, in some examples, provide computing resources such as, but not limited to, client entities, low latency data storage, durable data storage, data access, management, virtualization, cloud-based software solutions, electronic content performance management, etc. The one or more service provider computers 410 may also be operable to provide web hosting, computer application development, and/or implementation platforms, combinations of the foregoing, or the like to the one or more users 402.

In one illustrative configuration, the user computing devices 404 may include at least one memory 412 and one or more processing units or processor(s) 414. The processor(s) 414 may be implemented as appropriate in hardware, computer-executable instructions, firmware, or combinations thereof. Computer-executable instruction or firmware implementations of the processor(s) 414 may include computer-executable or machine-executable instructions written in any suitable programming language to perform the various functions described. The user devices 404 may also include geo-location devices (e.g., a global positioning system (GPS) device or the like) for providing and/or recording geographic location information associated with the user devices 404.

The memory 412 may store program instructions that are loadable and executable on the processor(s) 414, as well as data generated during the execution of these programs. Depending on the configuration and type of user device 404, the memory 412 may be volatile (such as random access memory (RAM)) and/or non-volatile (such as read-only memory (ROM), flash memory, etc.). The user device 404 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices, in some implementations, the memory 412 may include multiple different types of memory, such as static random access memory (SRAM), dynamic random access memory (DRAM), or ROM.

Turning to the components of the memory 412 in more detail, the memory 412 may include an operating system and one or more application programs or services for implementing the features disclosed herein including providing a testing input feature to the user via the browser application 406 or dedicated applications (e.g., smart phone applications, tablet applications, etc). The browser application 406 may be configured to receive and communicate a service URL or resource network identifier to the one or more service provider computers 410 and display a generated report of errors as described above. Additionally, the memory 412 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 402 provided response to a security question or a geographic location obtained by the user device 404.

In some examples, the networks 408 may include any one or a combination of many different types of networks, such as cable networks, the Internet, wireless networks, cellular networks and other private and/or public networks. While the illustrated example represents the users 402 accessing the browser application 406 over the networks 408, the described techniques may equally apply in instances where the users 402 interact with the one or more service provider computers 410 via the one or more user devices 404 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 406 may allow the users 402 to interact with the one or more service provider computers 410, such as to provide a network service identifier for executing the testing input feature as describe herein. The one or more service provider computers 410, perhaps arranged in a cluster of servers or as a server farm, may host the browser application 406 and/or cloud-based software services. Other server architectures may also be used to host the browser application 406 and/or cloud-based software services. The browser application 406 may be capable of handling requests from many users 402 and serving, in response, various user interfaces that can be rendered at the user devices 404 such as, but not limited to, a website or web page. The browser application 406 can interact with any type of website that supports user interaction, including social networking sites, electronic retailers, informational sites, blog sites, search engine sites, news and entertainment sites, and so forth. The described techniques can similarly be implemented outside of the browser application 406, such as with other applications running on the user device 404, such as through a command line tool.

The one or more service provider computers 410 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 410 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the one or more service provider computers 410 may be in communication with the user device 404 via the networks 408, or via other network connections. The one or more service provider computers 410 may include one or more servers, perhaps arranged in a cluster or as individual servers not associated with one another. The one or more service provider computers 410 may be in communication with one or more third party computers 416 via networks 408. The one or more service provider computers 410 that host the browser application 406 may obtain and provide data to third party computers 416 via networks 408 in accordance with embodiments described herein. The one or more third party computers 416 may implement the data schema/model parser or execution service components described above.

In one illustrative configuration, the one or more service provider computers 410 may include at least one memory 418 and one or more processing units or processors(s) 420. The processor(s) 420 may be implemented as appropriate in hardware, computer-executable instructions, firmware, or combinations thereof. Computer-executable instruction or firmware implementations of the processor(s) 420 may include computer-executable or machine-executable instructions written in any suitable programming language to perform the various functions described. The memory 418 may store program instructions that are loadable and executable on the processor(s) 420, as well as data generated during the execution of these programs. Depending on the configuration and type of the one or more service provider computers 410, the memory 418 may be volatile (such as RAM) and/or non-volatile (such as ROM, flash memory, etc.). The one or more service provider computers 410 or servers may also include additional storage 422, which may include removable storage and/or non-removable storage. The additional storage 422 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 418 may include multiple different types of memory, such as SRAM, DRAM, or ROM.

The memory 418, the additional storage 422, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 418 and the additional storage 422 are all examples of computer storage media. Additional types of computer storage media that may be present in the one or more service provider computers 410 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 410. Combinations of any of the above should also be included within the scope of computer-readable media. Alternatively, computer-readable communication media may include computer-readable instructions, program modules, or other data transmitted within a data signal, such as a carrier wave, or other transmission. However, as used herein, computer-readable storage media does not include computer-readable communication media.

The one or more service provider computers 410 may also contain communication connection(s) 424 that allow the one or more service provider computers 410 to communicate with a stored database, another computing device or server, user terminals and/or other devices on the networks 408. The one or more service provider computers 410 may also include I/O device(s) 426, such as a keyboard, a mouse, a pen, a voice input device, a touch input device, a display, speakers, a printer, etc.

Turning to the contents of the memory 418 in more detail and as will be described in further detail in FIG. 5, the memory 418 may include an operating system 428, one or more data stores 430, and/or one or more application programs or services for implementing the features disclosed herein including a testing input module 432. In accordance with at least one embodiment, the testing input module 432 may be configured to receive a resource network identifier, parse a programmatic interface schema, data schema, or data model associated with the resource network identifier for metadata including information about a method signature associated with the programmatic interface schema, determine testing input for a method corresponding to the method signature, execute the method utilizing the test input to generate a report of errors associated with a particular test input permutation of a plurality of test input permutations as determined above, and provide the generated report of errors to a user.

Figure 5:
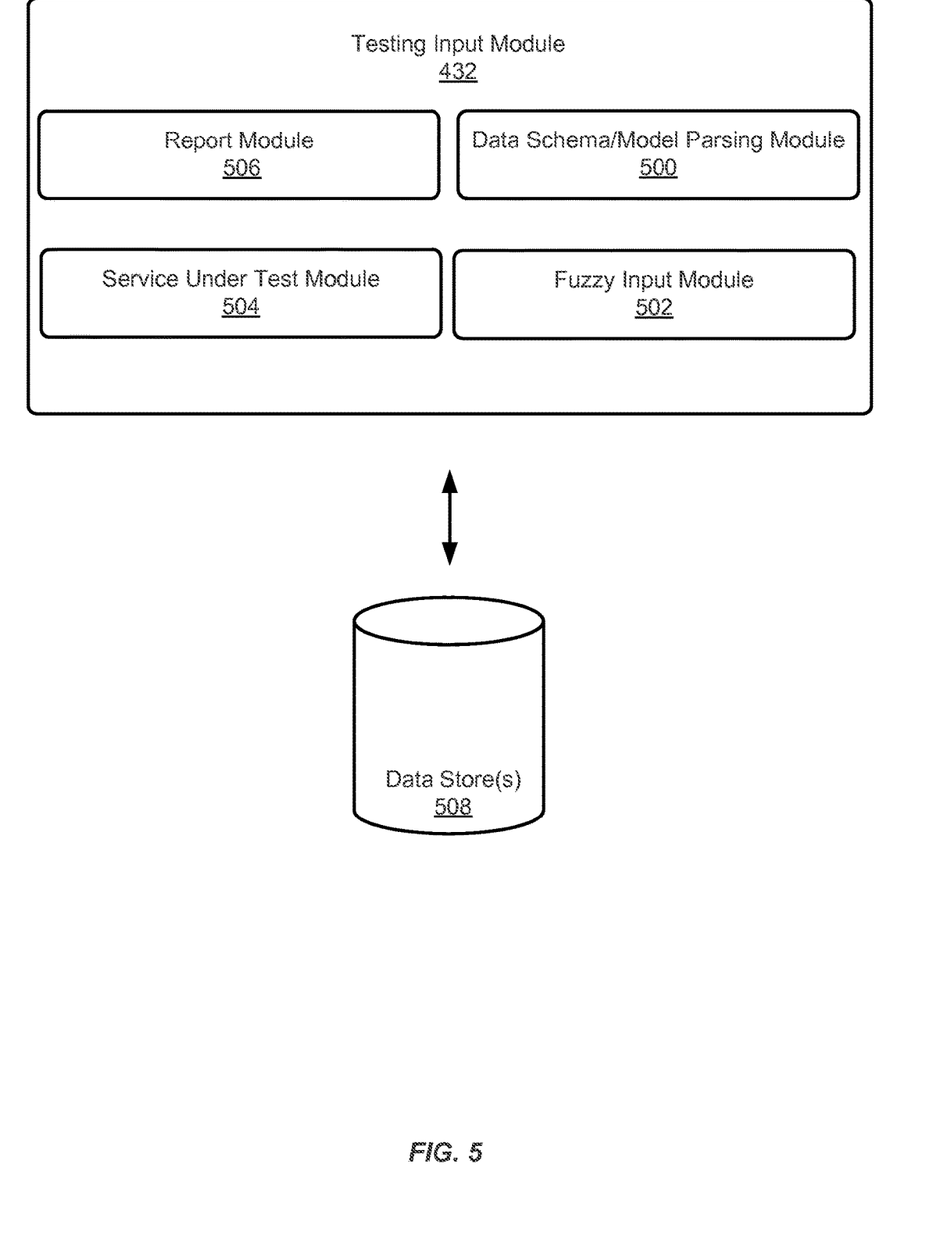
FIG. 5 illustrates a schematic diagram depicting aspects of a testing input module and associated data stores in accordance with at least one embodiment.

FIG. 5 illustrates a schematic diagram depicting aspects of a testing input module and associated data stores in accordance with at least one embodiment. It should be noted that while multiple modules are described in the example testing input module 432, the processes and methods described herein can be performed by more or less modules within memory such as memory 418 described above. In addition, while the modules 500-506 included in testing input module 432 are displayed and described as distinct modules, in some embodiments they may be included within one another to further facilitate methods and systems described herein. In accordance with at least one embodiment, the testing input module 432 may include a data schema/model parsing module 500, a fuzzy input module 502, an execution module 404, and a report module 506, in communication with one or more data stores 508 (which is an example of the one or more data stores 430 from FIG. 4).

In accordance with at least one embodiment, the testing input module 432 may obtain or receive a service URL or network service identifier from a user via the networks 408. In accordance with at least one embodiment, and as described above, the service URL may include a web form consisting of hypertext markup language (HTML) commands. In accordance with at least one embodiment, the network service identifier may invoke one or more APIs or methods. In accordance with at least one embodiment, the testing input module 432 may interact with the data schema/model parsing module 500 to parse a data model/schema associated with the network service identifier to obtain metadata including information about methods/signatures associated with the network service identifier. In accordance with at least one embodiment, the testing input module 432 may be configured to utilize the metadata obtained by the parser 500 to determine parameter input information for the methods/signatures associated with the network service identifier. The parameter input information can include the data types of each parameter associated with the methods/signatures. In accordance with at least one embodiment, the parsing module 500 may be configured to determine the parameter input information for the methods/signatures and communicate the parameter input information directly to the testing input module 432. In accordance with at least one embodiment, the parsing module 500 may be configured to obtain the metadata by parsing the computer code of the network service identifier.

In accordance with at least one embodiment, the testing input module 432 and the fuzzy input module 502 may be configured to use the parameter input information to generate/determine fuzzy test input for the methods/signatures associated with the network service identifier. In accordance with at least one embodiment, the fuzzy test input or test input includes a plurality of inputs for each parameter of the methods/signatures associated with the network resource identifier. The fuzzy test input or test input can include multiple permutations of input for each parameter, where each permutation is of the data type identified by the parameter input information as described above. In accordance with at least one embodiment, the fuzzy test input module 502 may randomly generate the permutations of input for each parameter based on the parameter input information. In accordance with at least one embodiment, the fuzzy test input module 502 may generate the permutations according to a random distribution around a seed value provided by a user, such as Gaussian or Poisson distribution. In accordance with at least one embodiment, the service may receive or define one or more seed input rules that specify the use of random distribution and standard deviations to be utilized with the random distribution. The test input generated by the fuzzy input module 502 may aid in determining security issues, unhandled exceptions, crashes, and memory leaks associated with the methods/signatures of the network service identifier when the methods are executed with the test input. In addition, the test input may efficiently identify the above mentioned issues because the test input executed by the method is based on the parameter input information previously determined rather than being randomly generated. Randomly generated test input may result in unhelpful errors based on mismatched data type parameters being executed by a method.

In accordance with at least one embodiment, the testing input module 432 may receive seed input information from a user. The seed input information may be utilized by the fuzzy input module to generate the test input for the methods/signatures associated with the network service identifier. In accordance with at least one embodiment, the seed input information may include a range of values for a particular parameter of a method associated with the network service identifier. For example, a user may wish to have the service determine fuzzy test input for a parameter but may want to define thresholds of ranges for the data type associated with the parameter. In accordance with at least one embodiment, the seed input information may include the only input for a particular parameter of a method associated with the network service identifier communicated to the service. In accordance with at least one embodiment, the parsing module 500 may be configured to parse the code of the API or the associated network service identifier and generate a data model/schema for further testing and generation of fuzzy test input by the fuzzy input module 502. In accordance with at least one embodiment, the seed input information may be utilized by the fuzzy input module 502 to randomly generate values around the seed value provided in a Gaussian distribution. In accordance with at least one embodiment, the seed input information may also include a standard deviation of the distribution the uses wishes the service to utilize. In accordance with at least one embodiment, the user may provide all the necessary parameters (such as seed input information) for all parameters of a data schema/model such that the service can determine the testing input or fuzzy generated values.

In accordance with at least one embodiment, the service under test module 504 may be configured to execute each method associated with the network service identifier with the plurality of permutations of the test input generated/determined by the fuzzy input module. The service under test module 504 may also use the seed input information provided by a user to include or not include the execution of particular methods as described above. In accordance with at least one embodiment, the service under test module 504 may track the information associated with each execution including the method signature information, the particular input permutation, and the result of each execution, such as any errors or crashes detected by the service under test module 504. In accordance with at least one embodiment, the service under test module 504 may interact with a web service to invoke each API identified by the parsing module 500 and track/record each server response to the API invocation with the fuzzy test input. In accordance with at least one embodiment, the service under test module 504 may interact with one or more third party computers, such as 416, to invoke each API with the fuzzy test input and record responses, such as server responses for the API invocation.

In accordance with at least one embodiment, the seed input information may indicate particular methods associated with a resource network identifier that the user wishes to submit to the service or particular methods that the user does not wish to submit to the service. For example, a user may only be interested in determining testing input for one method of a multi-method API submitted to the service or a user may wish to avoid detecting errors on a method that isn't in condition for testing yet. The user may indicate these exclusion or inclusion rules with the seed input information when invoking the service or by any other suitable means known in the art. In accordance with at least one embodiment, the service under test module 504 may execute a limited set of methods per user instructions with the generated test input or skip one or more methods per use instructions while executing all other methods.

In accordance with at least one embodiment, the service under test module 504 may execute the methods associated with the network service identifier based on rule information provided by a user. For example, certain methods may need to be tested in a certain order to result in a proper testing environment and avoid unnecessary errors caused by improper method invocation. In accordance with at least one embodiment, the testing input module 432 may receive or obtain this rule information in conjunction with the network service identifier, or the rules may be specified in the data schema/model parsed by parsing module 500. In accordance with at least one embodiment, the user may specify the granularity of execution according to the provided rule information. For example, the user may wish to only test the methods according to the appropriate order defined in the rule information. The user may also wish to test the methods invoked in a random order to identify a different set of errors associated with the network service identifier.

In accordance with at least one embodiment, the report module may collect the result information tracked by the service under test module 504 and generate a report similar to the report described above in FIG. 3. In accordance with at least one embodiment, the report module 506 may provide the generated report to the testing input module 432 to generate a different set of testing input for future testing of the network service identifier submitted to the service. In accordance with at least one embodiment, the report module 506 may provide the report to a separate parsing agent that can identify certain warnings or unhandled errors to aid the fuzzy input module 502 to generate a different set of testing input. In accordance with at least one embodiment, the report module 506 may provide the generated report to a user via email, by storing a text file to a location identified in the command line invocation of the service, or by presenting a report to the user via a web UI. In accordance with at least one embodiment, the testing input module 432 may be configured to communicate with one or more third party services to perform the operations described above with reference to the parsing module 500 and the service under test module 504.

Figure 6:
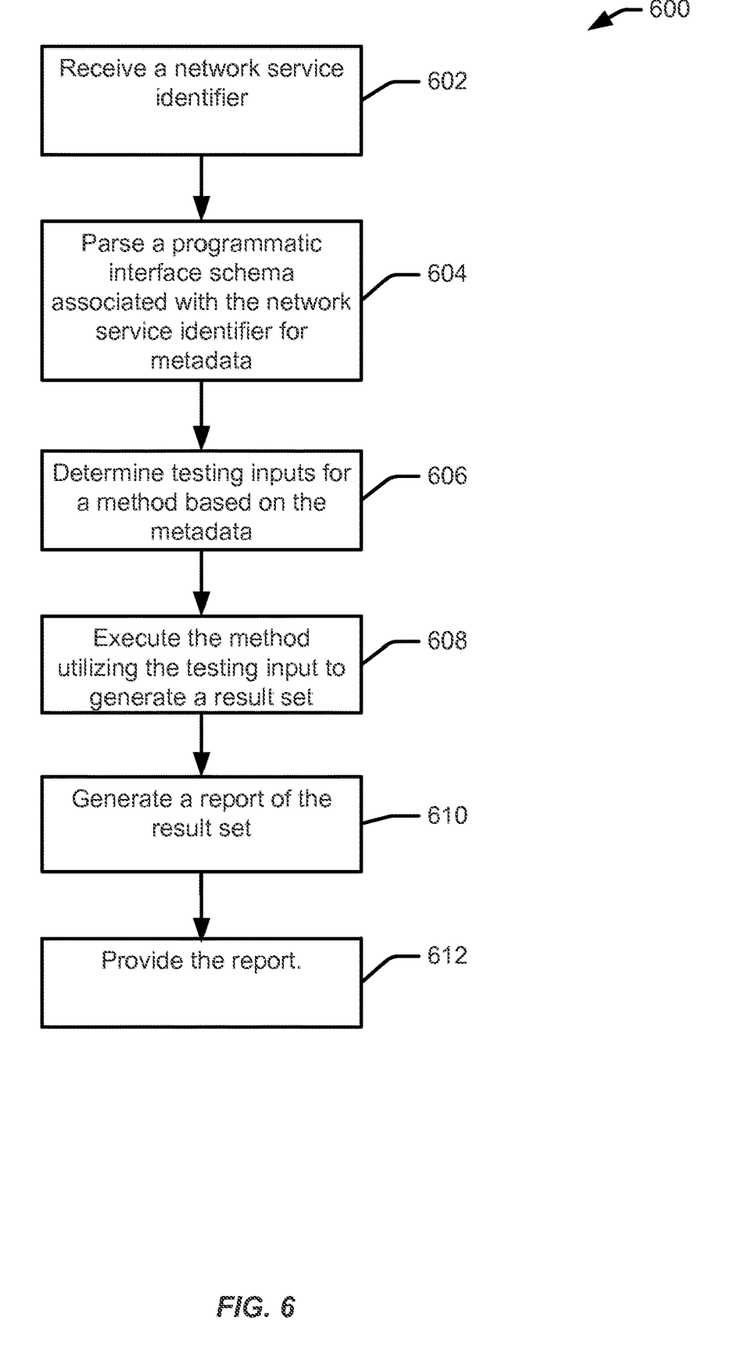
FIG. 6 illustrates a flow diagram of a process for a testing input feature as described herein, in accordance with at least one embodiment.
Figure 7:
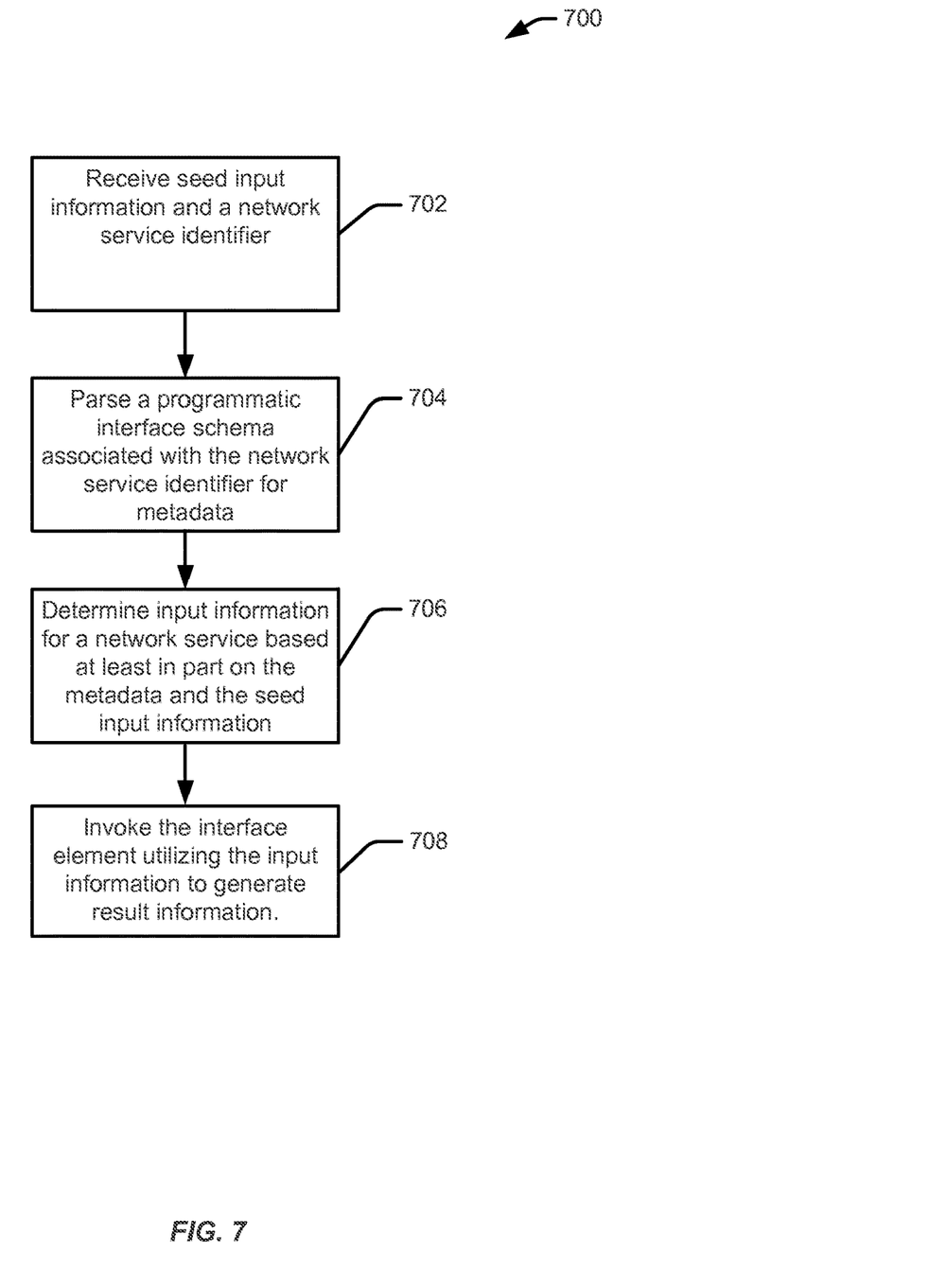
FIG. 7 illustrates a flow diagram of a process for a testing input feature as described herein, in accordance with at least one embodiment.

FIGS. 6 and 7 illustrate example flow diagrams showing respective processes 600 and 700 for providing a testing input feature described herein. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 410 (e.g., utilizing at least one of the testing input module 432, the data schema/model parsing module 500, the fuzzy input module 502, the service under test module 504, and the report module 506 in communication with one or more data stores 508) shown in FIGS. 4 and 5, may perform the process 600 of FIG. 6. In FIG. 6 the process 600 may include receiving a network service identifier. In accordance with at least one embodiment, the network service identifier may, be received from a web service provider. At 604, the process 600 may include parsing a programmatic interface schema associated with the network service identifier for metadata. In accordance with at least one embodiment, the metadata may include information about a method signature associated with the programmatic interface schema. At 606, the process 600 may include determining testing input for a method corresponding to the method signature based on the metadata. In accordance with at least one embodiment, the testing input can include a plurality of input permutations for one or more parameters of the method. Each input permutation of the plurality of input permutations may be of a data type identified by the method signature.

The process 600 may include at 608 executing the method utilizing the testing input to generate a result set. In accordance with at least one embodiment, each method identified in the programmatic interface schema may be executed with the various permutations of testing input. At 610, the process 600 may include generating a report of the result set. In accordance with at least one embodiment, the report may indicate the functionality of the method with a particular input permutation of the plurality of input permutations for one or more parameters of the method. The process 600 may conclude at 612 by providing the report to the service provider. In accordance with at least one embodiment, the report may be provided to the service provider via an email or via a web UI as described above. In accordance with at least one embodiment, the report may be provided to a user that is invoking the service by providing a network service identifier.

FIG. 7 illustrates a flow diagram of a process for a testing input feature as described herein, in accordance with at least one embodiment. In some examples, the one or more service provider computers 410 (e.g., utilizing at least one of the testing input module 432, the data schema/model parsing module 500, the fuzzy input module 502, the service under test module 504, and the report module 506 in communication with one or more data stores 508) shown in FIGS. 4 and 5, may perform the process 700 of FIG. 7. In FIG. 7 the process 700 may include receiving seed input information and a network service identifier. In accordance with at least one embodiment, the seed input information may include user pre-defined input for certain fields or parameters of a method associated with a network service identifier. At 704, the process 700 may include parsing a programmatic interface schema associated with the network service identifier for metadata. In accordance with at least one embodiment, the metadata may include parameter information associated with the programmatic interface schema. For example, the parameter information may indicate a data type associated with a parameter of a method corresponding to the programmatic interface schema.

The process 700 at 706 may include determining input information for the network service identifier based at least in part on the metadata and the seed input information. In accordance with at least one embodiment, the input information may include a plurality of input permutations for the network service identifier. The process 700 may conclude at 708 by invoking the interface element of the programmatic interface schema utilizing the input information to generate result information, in accordance with at least one embodiment, the result information may indicate the functionality of the interface element with an input permutation of the plurality of input permutations. In accordance with at least one embodiment, the service may collect the result information to generate a report and provide the report to a service provider or user.

Figure 8:
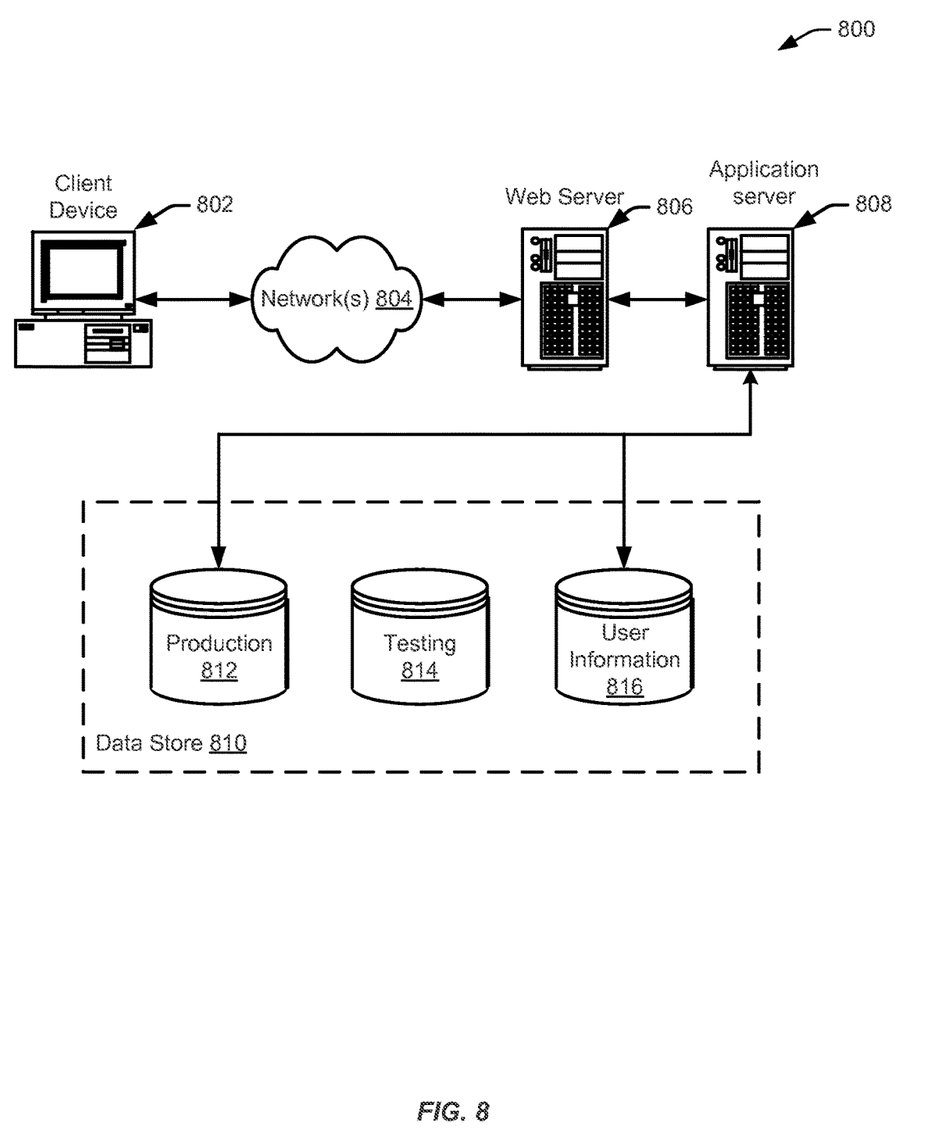
FIG. 8 illustrates an environment in which various embodiments of the testing input feature can be implemented in accordance with at least one embodiment.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might subunit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating, systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by, context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of V. or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computing system, a network service identifier from a service provider, the network service identifier comprising a uniform resource locator;
   parsing a programmatic interface schema associated with the network service identifier for metadata, the metadata including information about a method signature associated with the programmatic interface schema, and the programmatic interface schema associated with rule information indicating an order of execution of the method with respect to other methods associated with the programmatic interface schema, the rule information specified by the service provider;
   determining, in response to receiving the network service identifier, testing input for a method corresponding to the method signature based at least in part on the metadata, the testing input including a plurality of input permutations for one or more parameters of the method;
   executing, by the computing system, the method utilizing the testing input to generate a result set;
   generating a report of the result set, the report indicating functionality of the method with a particular input permutation of the plurality of input permutations for the one or more parameters of the method; and
   providing the report to the service provider.

2. The computer-implemented method of claim 1, wherein the programmatic interface schema indicates parameter value limits for the one or more parameters of the method.

3. The computer-implemented method of claim 2, further comprising determining the testing input for the method corresponding to the method signature based at least in part on the metadata and the parameter value limits.

4. The computer-implemented method of claim 1, wherein the programmatic interface schema includes and defines the rule information.

5. The computer-implemented method of claim 1, further comprising receiving user input that identifies seed input information for a particular parameter of the one or more parameters, wherein determining the testing input for the method comprises determining a first portion of the testing input for the method based at least in part on the metadata and determining a second portion of the testing input for the method based at least in part on the seed input information.

6. A system, comprising:
at least one processor; and
memory including computer-executable instructions that, when executed by the at least one processor, cause the system to at least:
receive a programmatic interface schema associated with a network service identifier from a service provider, the programmatic interface schema including an interface element;
parse the programmatic interface schema for parameter information associated with the interface element, the programmatic interface schema associated with rule information indicating an order of execution for the interface element with respect to other interface elements associated with the programmatic interface schema, the rule information specified by the service provider;
determine, in response to receiving the programmatic interface scheme, test input for the interface element based at least in part on the parameter information, the test input including a plurality of input permutations for the interface element;
generate a report indicating functionality of the interface element with a particular input permutation of the plurality of input permutations after the interface element is executed using the test input; and
provide the report for presentation.

7. The system of claim 6, wherein the interface element includes a web service interface element, a messaging protocol element, or an application programming interface (API) element.

8. The system of claim 6, wherein the report is provided to the service provider.

9. The system of claim 8, wherein the report is provided to the service provider by providing an email containing the report to the service provider, providing the report via a file transfer protocol (FTP) server for download by the service provider, or presenting the report via a web user interface to the service provider.

10. The system of claim 6, wherein the computer-executable instructions, when executed by the at least one processor, further cause the system to at least:
parse the report to generate summary information, the summary information including unhandled errors and exceptions resulting from the execution of the interface element utilizing the plurality of input permutations; and
determine the test input for the interface element based at least in part on the parameter information and the summary information.

11. A computer-readable storage medium storing computer-executable instructions that, when executed by a computer system, configure the computer system to perform operations comprising:
receiving, from a user, seed input information and a network service identifier, the network service identifier comprising a uniform resource locator;
parsing a programmatic interface schema associated with the network service identifier for metadata, the metadata including parameter information associated with the programmatic interface schema, the programmatic interface schema associated with rule information indicating an order of execution for an interface element of the programmatic interface schema with respect to other interface elements of the programmatic interface schema, the rule information specified by a service provider;
determining, in response to receiving the seed input information and the network service identifier, input information for a network service associated with the network service identifier based at least in part on the metadata and the seed input information, the seed input information including a plurality of input permutations for the interface element of the programmatic interface schema; and
invoking the interface element utilizing the input information to generate result information, the result information indicating functionality of the interface element of the network service with an input permutation of the plurality of input permutations.

12. The computer-readable storage medium of claim 11, wherein determining the input information includes randomly generating the plurality of input permutations with respect to the seed input information.

13. The computer-readable storage medium of claim 11, wherein the seed input information indicates excluding a method associated with the network service identifier or limiting the execution of the network service identifier to one or more methods associated with the network service identifier.

14. The computer-readable storage medium of claim 13, further comprising executing the network service identifier utilizing the input information to generate the result information based at least in part on the seed input information.

15. The computer-readable storage medium of claim 11, further comprising parsing computer code associated with the network service identifier to determine the programmatic interface schema.

16. The computer-readable storage medium of claim 11, wherein determining the input information for the interface element includes using a data range specified by the user to limit the plurality of input permutations for the interface element.

17. The computer-readable storage medium of claim 11, wherein the programmatic interface schema is specified by at least a web service definition language, a web services description language, JavaScript object notation (JSON), or an extensible markup language.

18. The computer-readable storage medium of claim 11, further comprising:
receiving seed input rules, the seed input rules indicating a random distribution of data values corresponding to the seed input information; and
determining the input information for the interface element based at least in part on the seed input rules and the seed input information.

19. The computer-readable storage medium of claim 18, wherein the seed input rules include a standard deviation to be used in the random distribution of the data values.

* * * * *